(12) United States Patent
Kim et al.

(10) Patent No.: US 7,953,043 B2
(45) Date of Patent: May 31, 2011

(54) PACKET SWITCHED RADIO TELECOMMUNICATION SYSTEM SUPPORTING HARD HANDOVER AND METHOD FOR HARD HANDOVER

(75) Inventors: Kil Soo Kim, Seoul (KR); Sung Jin Suh, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 708 days.

(21) Appl. No.: 11/690,330

(22) Filed: Mar. 23, 2007

(65) Prior Publication Data

US 2007/0230402 A1 Oct. 4, 2007

(30) Foreign Application Priority Data

Mar. 29, 2006 (KR) .................. 10-2006-0028664

(51) Int. Cl.
*H04W 4/00* (2009.01)
*H04W 36/00* (2009.01)
*H04B 7/00* (2006.01)

(52) U.S. Cl. ........ 370/331; 370/310; 370/328; 455/433; 455/435.1; 455/436; 455/439

(58) Field of Classification Search .................. 370/331, 370/310, 328; 455/433, 435.1, 436, 439
See application file for complete search history.

(56) References Cited

U.S. PATENT DOCUMENTS

| 2002/0021681 | A1 | 2/2002 | Madour |
| 2003/0053430 | A1 | 3/2003 | Choi et al. |
| 2003/0099219 | A1* | 5/2003 | Abrol et al. .................. 370/338 |
| 2004/0148427 | A1* | 7/2004 | Nakhjiri et al. ............... 709/237 |
| 2005/0286469 | A1 | 12/2005 | Yang et al. |
| 2006/0280146 | A1* | 12/2006 | Koodli et al. ................. 370/331 |

FOREIGN PATENT DOCUMENTS

| JP | 2004-088410 | 3/2004 |
| KR | 1020010062319 | 7/2001 |
| WO | 2004-051422 | 6/2004 |
| WO | 2006/003497 | 1/2006 |

OTHER PUBLICATIONS

European Search Report dated Aug. 31, 2007.

* cited by examiner

*Primary Examiner* — Jinsong Hu
*Assistant Examiner* — Mong-Thuy Tran
(74) *Attorney, Agent, or Firm* — H.C. Park & Associates, PLC

(57) ABSTRACT

A packet switched radio telecommunication system supporting hard handover adapts Always_on technology to a link between a target packet data serving node (PDSN) and a support PDSN. The support PDSN assigns a temporary IP address to a mobile terminal in its service area, and transmits handover data and the mobile terminal's temporary IP address to the target PDSN via a direct link when the mobile terminal leaves the service area. The target PDSN, upon receiving a registration request for the temporary IP address from the mobile terminal moved to its service area, temporarily registers the temporary IP address in an IP pool. The target PDSN receives down-link frame data for the mobile terminal at the temporarily registered IP address from the support PDSN via the direct link. A new temporary IP address is assigned by the target PDSN when data transmission/reception is complete to the mobile terminal.

10 Claims, 2 Drawing Sheets

PACKET SWITCHED RADIO TELECOMMUNICATION SYSTEM SUPPORTING HARD HANDOVER AND METHOD FOR HARD HANDOVER

CROSS-REFERENCE TO RELATED APPLICATION

The present application claims priority from and the benefit of Korean Patent Application No. 10-2006-0028664, filed on Mar. 29, 2006, which is hereby incorporated by reference for all purposes as if fully set forth herein.

BACKGROUND OF THE INVENTION

1. Field of the Invention

The present invention relates to a packet switched radio telecommunication system supporting hard handover and a method for hard handover, and more particularly to a packet switched radio telecommunication system supporting mobile IP hard handover without data corruption or data loss, and a method for hard handover.

2. Background of the Invention

Mobile Internet Protocol (IP) is a standard IP that incorporates mobility of devices connected to the internet. Under Mobile IP, an IP address is allocated to a mobile terminal when a mobile terminal roams and temporarily gains access to the internet via a fixed network other than the mobile terminal's home network.

FIG. 1 is a block diagram of a network of a conventional packet switched radio telecommunication system. Mobile IP will now be described in detail with reference to FIG. 1.

Upon initial subscription, a mobile terminal (MS) 101 is connected to the Internet 106 via its home network area and receives an inherent IP address from its home agent (HA) 108. However, when the MS moves from its home network area to a foreign network area, the MS 101 is assigned a care-of address (CoA) corresponding to an IP address of the foreign agent (FA) 105 in the foreign network area and is assigned a temporary IP address from the FA 105. Then, a server 107 transmits data to the HA 108 using the inherent IP address of the MS 101, even if the MS 101 has moved outside of its home network. The HA 108 receives data intended for the MS 101, encapsulates the data, and transmits the encapsulated data to the CoA corresponding to the IP address of the FA 105 in the foreign network area. The FA 105 then transmits data to the MS 101 using to the temporary IP address. Thus, data transmitted by the server 107 to the MS 101 is routed through the HA 108 and the FA 105 in the foreign network area.

In the conventional mobile IP structure described above, when the MS 101 carries out handover, the MS 101 first transmits a handover request to the HA 108 via a support base station controller (BSC) 102, which may be combined with a packet control function (PCF), and a support packet data serving node (PDSN) 103. Further, when a target FA 105 in the foreign network area to which the MS 101 is moving is connected to a target PDSN 105 and a target BSC/PCF 104, the MS 101 disconnects a link set to the support BSC 102 and the support PDSN 103, sets a new link to the target PSDN/FA 105, and is assigned with a temporary IP address from the target FA 105. Thus, data transmitted from the server 107 is routed by the HA 108 to the MS 101 at the temporary IP address provided by the target FA 105.

The above-mentioned prior handover method has a problem in that when a MS 101 is hard handed over from a previous channel in the home network area to a new channel in the foreign network area, the connection to the home network area channel is broken before the connection to the foreign network area channel occurs. Accordingly, up-link and down-link paths are interrupted with respect to radio interface, and frame loss may result.

Korean Patent Application Publication No. 10-2001-0062319 discloses a hard handover method in which a direct link is established between the support PDSN 103 and the target PDSN 105, thereby causing a shorter disconnection with the MS 101 during the hard handover.

More specifically, a target PDSN 105 requests the support PDSN 103 for a temporary direct link. Then, when an up-link frame is transmitted from an MS 101 to a support PDSN 103 after the target PDSN 105 requests a temporary direct link with the support PDSN 103, the support PDSN 103 transmits the up-link frame from the MS 101 to the target PDSN 105 via the temporary direct link. At the same time, the support PDSN 103 transmits the up-link frame to a core network including the Internet 106. Then, the core network concurrently transmits down-link frames to both the target PDSN 105 and the support PDSN 103. The target PDSN 105 determines a handover completion time and transmits a handover command signal to the support PDSN 103 via the core network.

However, with Korean Patent Application Publication No. 10-2001-0062319, there may be delays associated with requesting and setting a temporary direct link between the support PDSN 103 and the target PDSN 105. Further, there may be delays associated with requesting the core network for handover and receiving a corresponding response. Because the request passes through the core network including the Internet 106, the delay time may be much greater. Furthermore, a network load is doubled since data is transmitted from the core network to both the target PDSN 105 and the support PDSN 103 until handover is complete.

SUMMARY OF THE INVENTION

The present invention provides a packet switched radio telecommunication system supporting hard handover without data transmission delay and data corruption or loss and a method for hard handover.

Additional features of the invention will be set forth as follows, and in part will be apparent from the description, or may be learned by practice of the invention.

The present invention discloses a packet switched radio telecommunication system including a support packet data serving node (PDSN) to assign a temporary Internet Protocol (IP) address to a mobile terminal in its service area, to maintain a direct link to a neighboring PDSN, and to transmit handover data and the temporary IP address to the neighboring PDSN via the direct link, and a target PDSN to register the temporary IP address in an IP pool in response to a request from the mobile terminal moved into a service area of the target PDSN. Further, the target PDSN receives down-link frame data from the support PDSN via the direct link, the down-link frame data being transmitted to the mobile terminal at the temporary IP address, and the neighboring PDSN is the target PDSN.

The present invention also discloses a method for handing over a mobile terminal from a support packet data serving node (PDSN) to a target PDSN. The method includes assigning a temporary IP address to the mobile terminal in a service area of the support PDSN, configuring a direct link between the support PDSN and the target PDSN and maintaining a protocol configuration, transmitting handover data and a temporary IP address of the mobile terminal from the support PDSN to the target PDSN via the direct link, requesting registration of the temporary IP address from the target PDSN, and registering the temporary IP address of the mobile terminal in an IP pool of the target PDSN.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
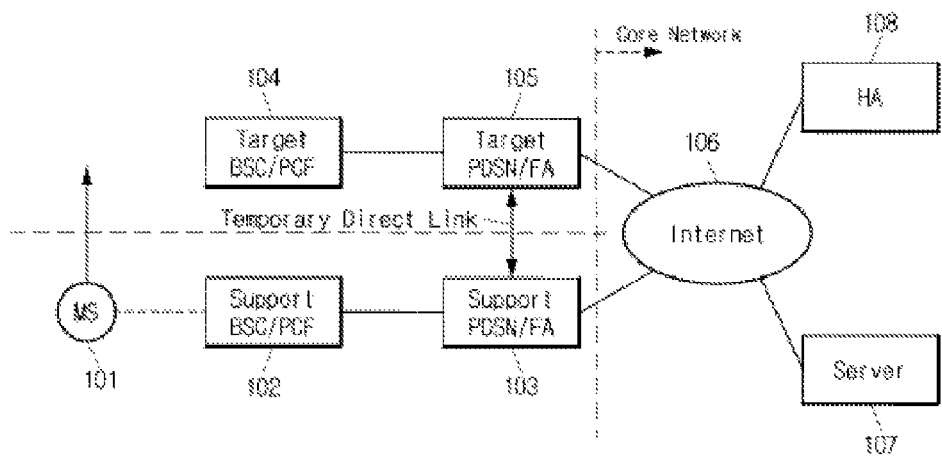
FIG. 1 is a block diagram of a network of a conventional packet switched radio telecommunication system.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly connected to" another element, there are no intervening elements present.

Always_on technology included in the present invention will now be explained briefly prior to describing the exemplary embodiments.

Always_on technology is technology that always maintains a Point to Point Protocol (PPP) connection of a data link between a mobile terminal and a PDSN/FA. If the mobile terminal is powered on and Always_on technology is activated, the PPP configuration between the mobile terminal and a network is maintained. Maintaining the PPP configuration equates to maintaining an authentication process and the network protocol configuration between end-to-end nodes even without data traffic. Thus, while maintaining the PPP configuration, data can be directly received and/or transmitted between the mobile terminal and PDSN/FA without a separate PPP connection process.

Figure 2:
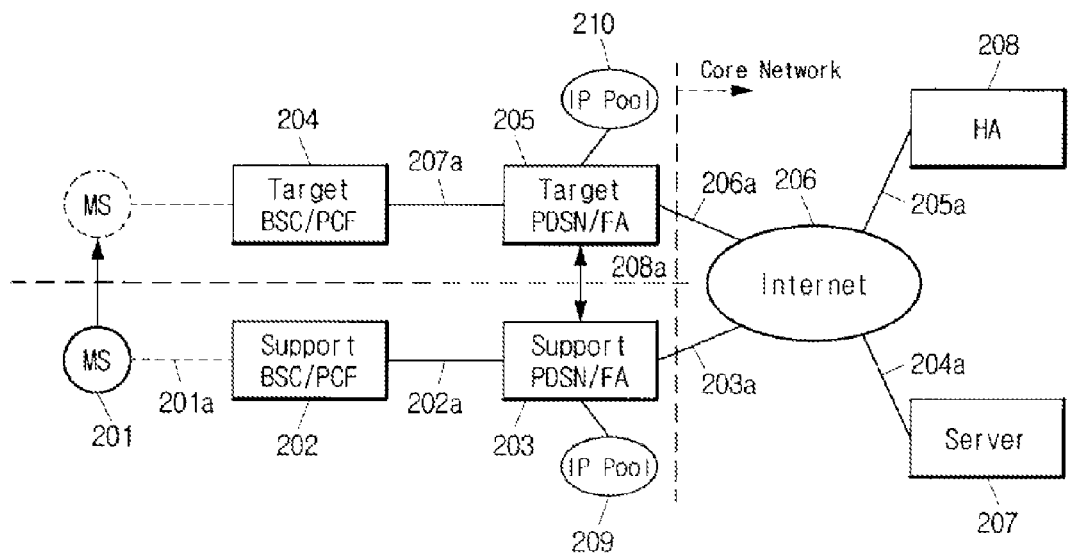
FIG. 2 is a block diagram of a network of a packet switched radio telecommunication system according to an exemplary embodiment of the present invention.

FIG. 2 is a block diagram of a network of a packet switched radio telecommunication system according to an exemplary embodiment of the present invention.

The present invention adapts the Always_on technology to a link 208a between a target PDSN 205 and a support PDSN 203 as illustrated in FIG. 2. That is, authentication or a network protocol for an MS 201 connected to the support PDSN 203 is previously configured and then maintained. Thus, when an MS 201 is handed over from the support PDSN 203 to the target PDSN 205, the support PDSN 203 can directly transmit handover information of the MS 201 hand over to the target PDSN 205. In addition, the support PDSN 203 can transmit a down-link frame received from the server 207 to the target PDSN 205.

In FIG. 2, the support PDSN 203 has an IP pool 209, and the target PDSN 205 has an IP pool 210. In general, an IP pool such as IP pool 210 includes temporary IP addresses that may be assigned to a roaming MS 201 by a target PDSN/FA 205 via target BSC/PCF 204. A target PDSN/FA 205 temporarily assigns one of temporary IP addresses in the IP pool 210 to the MS 201 that configures a connection to the target PDSN/FA 205. The IP pool is exemplified as follows:

IP pool 210 in target PDSN: (3.0.0.1), (3.0.0.2), (3.0.0.3), (3.0.0.4), . . .

IP pool 209 in support PDSN: (2.0.0.1), (2.0.0.2), (2.0.0.3), (2.0.0.4), . . .

However, according to the present invention, the MS 201 is assigned with a temporary IP address from the support PDSN 203 and transmits data to the server 207 via link 201a, 202a, 203a, and 204a. If the MS 201 is handed over to the target PDSN 205, the MS continues to use the temporary IP address assigned from the support PDSN 203 without being assigned with a temporary IP address from the target PDSN 205.

For example, an inherent IP address of the MS 201 registered in its HA 208 may be 1.0.0.1, and a temporary IP address assigned from the support PDSN 203 is 2.0.0.1.

Data intended for the MS 201 is transmitted from the server 207 to the Internet 206 via a link 204a and then to the HA 208 via a link 205a. The data is encapsulated at the HA 208. The encapsulated data is transmitted from the HA 208 to the Internet 206 via link 205a, and then to the current support PDSN 203 via the link 203a. The encapsulated data transmitted to the support PDSN 203 is transmitted to the MS 201 having the temporary IP address 2.0.0.1 via a support BSC/PCF 202. To transmit data, the MS 201 transmits data to the server 207 via link 201a, link 202a, link 203a, and the link 204a without passing through the HA 208.

When the MS 201 carries out handover, the support PDSN 203 transmits handover data to the target PDSN 205 via the direct link 208a without transmitting the same to the core network, which includes the Internet 206 and the server 207. Herein, the support PDSN 203 transmits the temporary IP address 2.0.0.1 assigned to the MS 201 to the target PDSN 205.

Then, the MS 201 carrying out handover requests registration of the temporary IP address 2.0.0.1 from the target PDSN 205 via the target BSC/PCF 204. When the temporary IP address included in the registration request is identical to the temporary IP address transmitted from the support PDSN 203 to the target PDSN 205 via the link 208a, the target PDSN 205 temporarily registers the temporary IP address in its IP pool 210, and allows the MS 201 to use the temporary IP address continuously.

In addition, down-link frame data transmitted from the server 207 to the support PDSN 203 via the HA 208 is transmitted to the target PDSN 205 via a link 208a, and then the down-link frame data transmitted to the target PDSN 205 is transmitted to the MS 201 using the temporary IP address 2.0.0.1 via link 207a. The MS 201 being in an activated state and using the temporary IP address assigned by support PDSN 203 can carry out handover without data corruption or loss through the above process.

If the MS 201, which has carried out handover to the target PDSN 205 and still uses the temporary IP address assigned by the support PDSN 203, enters into a data dormant state, or has completed data transmission, the MS 201 may relinquish the temporary IP address 2.0.0.1 of the support PDSN 203 to the support PDSN 203. The MS 201 is then assigned with a new temporary IP address 3.0.0.1 through a new PPP connection to the target PDSN 205, and registers a Care-of Address (CoA) of the target FA 205 in the core network including the HA 208. Then, when the MS 201 comes out of the dormant state, or receives/transmits data again, the server 207 transmits the data to the target PDSN 205 at the CoA via the HA 208, link 205*a*, and link 206*a*, and then the target PDSN 205 transmits the data to the MS 201 assigned with the temporary IP address 3.0.0.1.

Figure 3:
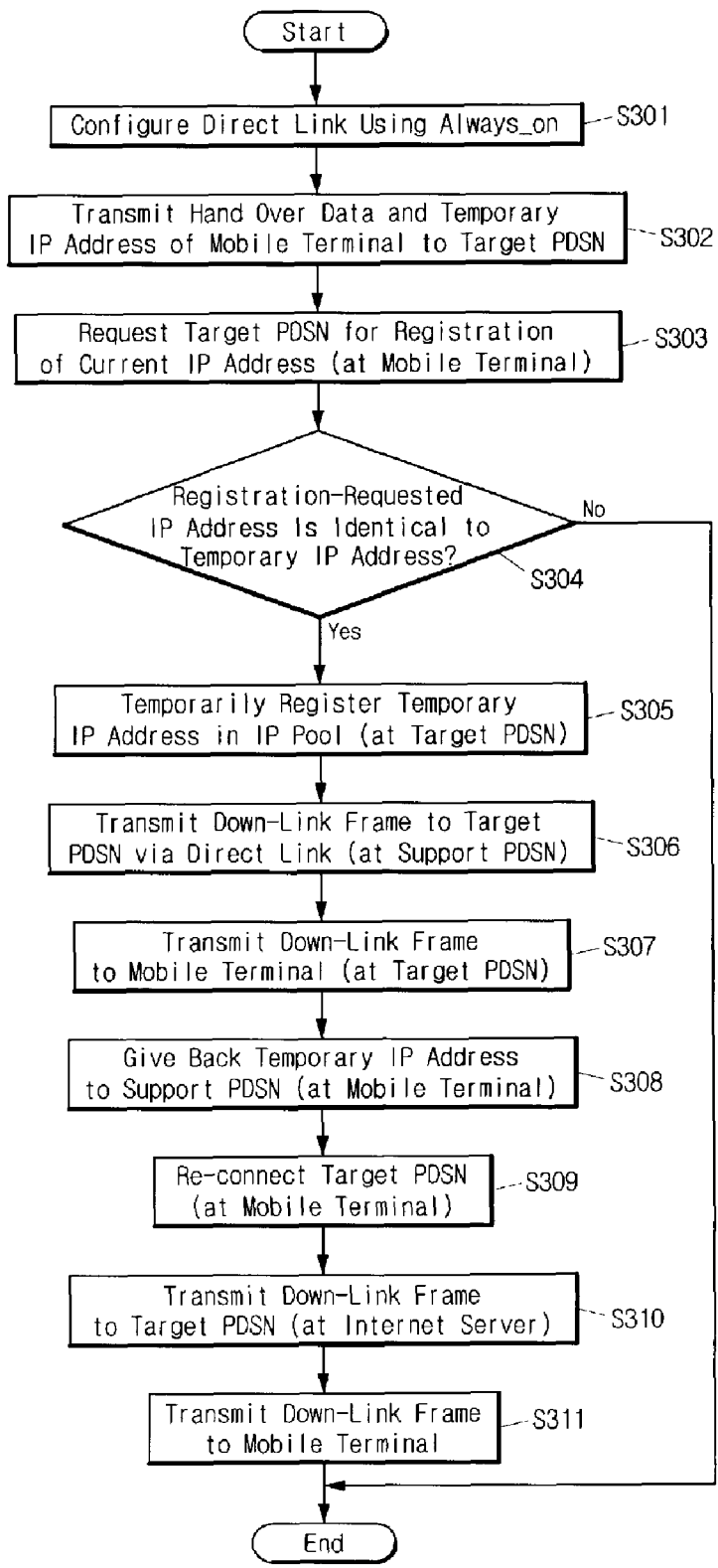
FIG. 3 is a flow chart illustrating a method for hard handover in the packet switched radio telecommunication system according to an exemplary embodiment of the present invention.

FIG. 3 is a flow chart illustrating a method for hard handover in the packet switched radio telecommunication system according to an exemplary embodiment of the present invention.

As illustrated in FIG. 3 a direct link is configured between a support PDSN and a target PDSN using Always_on technology at step S301. That is, the target PDSN configures the authentication for the MS having been connected to the support PDSN or configures a network protocol, and maintains the same.

Then, if the MS connected to the support PDSN carries out handover, the support PDSN transmits to the target PDSN 205 the handover data of the MS and the temporary IP address data assigned to the MS by the support PDSN at step S302.

Next, the MS requests the target PDSN for registration of the currently used temporary IP address assigned by the support PDSN via the target BSC at step S303.

The target PDSN compares the temporary IP address in the registration request from the MS with the temporary IP address transmitted by the support PDSN via the direct link at step S304.

If the temporary IP address in the registration request from the MS is identical to the temporary IP address transmitted by the support PDSN, the target PDSN temporarily registers the temporary IP address in its IP pool at step S305.

Then, down-link frame data transmitted from the internet server via the HA to the support PDSN is transmitted to the target PDSN via the direct link at step S306.

The target PDSN receives the down-link frame data transmitted via the direct link and transmits the down-link frame data to the MS carrying out handover via the target BSC at step S307.

Meanwhile, if the MS is in a data dormant state, or has completed data transmission, the MS gives back the temporary IP address assigned by the support PDSN to the support PDSN at step S308.

Then, the MS is assigned a new temporary IP address for a new PPP connection by the target PDSN, and registers the CoA of the changed FA in the core network including the HA at step S309.

Then, if the MS comes out of the dormant state, or receives/transmits data again, the internet server transmits the down-link frame data to the target PDSN at the CoA via the HA at step S310

The target PDSN transmits the down-link frame data to the MS assigned to the new temporary IP address at step S311.

The above-mentioned method of the present invention may be embodied into a program so that it is stored in a recording medium, such as CD-ROM, RAM, floppy disc, hard disc, magneto-optical disc, in a form readable by a computer.

As set forth before, according to the present invention, a direct link is configured between the target PDSN and the support PDSN, thereby reducing a time delay in requesting handover. The handover is performed without informing the core network of the handover state of the MS, thereby reducing a delay occurring due to the core network. Moreover, in performing the handover by the MS, the IP re-configuration is not needed so that data corruption or loss may not occur.

It will be apparent to those skilled in the art that various modifications and variations can be made in the present invention without departing from the spirit or scope of the invention. Thus it is intended that the present invention cover the modifications and variations of this invention provided they come within the scope of the appended claims and their equivalents.

What is claimed is:

1. A packet switched radio telecommunication system, comprising:
   a support packet data serving node (PDSN) to assign a temporary Internet Protocol (IP) address to a mobile terminal in its service area, to maintain a direct link to a neighboring PDSN, and to transmit handover data and the temporary IP address assigned by the support PDSN to the neighboring PDSN via the direct link; and
   a target PDSN to register the temporary IP address in an IP pool in response to a request from the mobile terminal moved into a service area of the target PDSN,
   wherein the target PDSN receives down-link frame data from the support PDSN via the direct link, the down-link frame data being transmitted to the mobile terminal at the temporary IP address, and
   wherein the neighboring PDSN is the target PDSN, and the target PDSN compares a temporary IP address identified by the mobile terminal with the temporary IP address transmitted from the support PDSN, and if they are identical, registers the temporary IP address in the IP pool.

2. The packet switched radio telecommunication system of claim 1, wherein the mobile terminal gives back the temporary IP address to the support PDSN after moving to the service area of the target PDSN, and is assigned with a new temporary IP address corresponding to an IP address from the IP pool.

3. The packet switched radio telecommunication system of claim 2, wherein the mobile terminal gives back the temporary IP address to the support PDSN after data transmission or reception is complete.

4. The packet switched radio telecommunication system of claim 2, wherein the mobile terminal gives back the temporary IP address to the support PDSN if the mobile terminal enters a dormant state.

5. A method for handing over a mobile terminal from a support packet data serving node (PDSN) to a target PDSN, the method comprising:
   assigning a temporary IP address to the mobile terminal in a service area of the support PDSN;
   configuring a direct link between the support PDSN and the target PDSN and maintaining a protocol configuration;
   transmitting handover data and a temporary IP address of the mobile terminal from the support PDSN to the target PDSN via the direct link;
   requesting registration of the temporary IP address to the target PDSN;
   registering the temporary IP address of the mobile terminal in an IP pool of the target PDSN;
   transmitting down-link frame data transmitted from a core network from the support PDSN to the target PDSN via the direct link; and
   transmitting the down-link frame data to the mobile terminal in a service area of the target PDSN at the temporary IP address, wherein registering the temporary IP address comprises comparing by the target PDSN a temporary IP address identified by the mobile terminal with the temporary IP address transmitted from the support PDSN, and registering the temporary IP address in the IP pool of the target PDSN if they are identical.

6. The method of claim 5, further comprising:

giving back the temporary IP address to the support PDSN; and assigning the mobile terminal with a new temporary IP address through a Point to Point Protocol (PPP) connection to the target PDSN, and registering the new temporary IP address in the core network.

7. The method of claim 6, wherein the core network comprises a home agent of the mobile terminal.

8. The method of claim 6, wherein the new temporary IP address corresponds to an IP address from an IP pool in the target PDSN.

9. The method of claim 6, wherein the mobile terminal gives back the temporary IP address to the support PDSN after data transmission or reception is complete at the mobile terminal.

10. The method of claim 6, wherein the mobile terminal gives back the temporary IP address to the support PDSN if the mobile terminal enters a dormant state.

* * * * *